United States Patent
Crawford et al.

(10) Patent No.: US 10,809,917 B2
(45) Date of Patent: *Oct. 20, 2020

(54) USER INTERFACE FOR HOST PORT ASSIGNMENT

(71) Applicant: INTERNATIONAL BUSINESS MACHINES CORPORATION, Armonk, NY (US)

(72) Inventors: Joshua J. Crawford, Tucson, AZ (US); Jason L. Peipelman, Austin, TX (US); Feng Shao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,577

(22) Filed: Nov. 26, 2018

(65) Prior Publication Data

US 2019/0138213 A1    May 9, 2019

Related U.S. Application Data

(63) Continuation of application No. 14/887,199, filed on Oct. 19, 2015, now Pat. No. 10,156,991.

(51) Int. Cl.
*G06F 3/048* (2013.01)
*G06F 3/06* (2006.01)

(52) U.S. Cl.
CPC ............ *G06F 3/0605* (2013.01); *G06F 3/067* (2013.01); *G06F 3/0632* (2013.01)

(58) Field of Classification Search
CPC ......... G06F 3/048; G06F 3/067; G06F 3/0665
See application file for complete search history.

(56) References Cited

U.S. PATENT DOCUMENTS

| | | |
|---|---|---|
| 6,009,466 A | 12/1999 | Axberg et al. |
| 6,330,005 B1 | 12/2001 | Tonelli et al. |
| 6,421,711 B1 | 7/2002 | Blumenau et al. |
| 7,533,169 B1 | 5/2009 | Gold et al. |
| RE41,397 E | 6/2010 | Latif et al. |
| 7,865,587 B1 | 1/2011 | Jin et al. |
| 8,250,317 B2 | 8/2012 | Satoyama et al. |

(Continued)

OTHER PUBLICATIONS

Office Action 1 for U.S. Appl. No. 14/887,199, dated Sep. 7, 2017, 19 pp. [18.589 (OA1)].

(Continued)

*Primary Examiner* — Mahelet Shiberou
(74) *Attorney, Agent, or Firm* — Konrad Raynes Davda & Victor LLP

(57) ABSTRACT

In a storage management interface to manage host ports in a computing system having a server and one or more hosts, a user interface is provided to facilitate assigning host ports to an associated host. In one embodiment, the user interface detects unassigned host ports which have not been identified as being assigned to an associated host, and generates a graphical user interface (GUI) page indicating unassigned host ports. User selection of at least one of the unassigned host ports indicated in the GUI page is received as well as user selection of a host to assign to the selected unassigned host ports. Once the assignment is completed, data structures storing host port assignment configuration data are updated to indicate the host assigned to the selected host ports.

21 Claims, 14 Drawing Sheets

(56) References Cited

U.S. PATENT DOCUMENTS

| | | | |
|---|---|---|---|
| 8,631,111 B2 | 1/2014 | Kano et al. | |
| 9,779,003 B2* | 10/2017 | Li-On | G06F 11/3034 |
| 10,156,991 B2 | 12/2018 | Crawford et al. | |
| 2002/0144024 A1 | 10/2002 | Kumpf et al. | |
| 2006/0123157 A1 | 6/2006 | Kalos et al. | |
| 2007/0079103 A1 | 4/2007 | Mimatsu | |
| 2013/0132875 A1 | 5/2013 | Allen et al. | |
| 2014/0204747 A1* | 7/2014 | Yu | H04L 47/41 370/235 |

OTHER PUBLICATIONS

Response to Office Action 1 for U.S. Appl. No. 14/887,199, dated Jan. 3, 2018, 12 pp. [18.589 (ROA1)].

Final Office Action 1 for U.S. Appl. No. 14/887,199, dated Apr. 24, 2018, 16 pp. [18.589 (FOA1)].

Response to Final Office Action 1 for U.S. Appl. No. 14/887,199, dated Jun. 25, 2018, 15 pp. [18.589 (RFOA1)].

Notice of Allowance 1 for U.S. Appl. No. 14/887,199, dated Nov. 13, 2018, 17 pp. [18.589 (NOA1)].

List of IBM Patents or Patent Applications Treated as Related, dated Jun. 13, 2019, 2 pp.

\* cited by examiner

USER INTERFACE FOR HOST PORT ASSIGNMENT

BACKGROUND OF THE INVENTION

1. Field of the Invention

The present invention relates to a computer program product, system, and method for a storage management interface.

2. Description of the Related Art

In a storage environment, a storage controller also often referred to as a server, typically receives input/output (I/O) instructions from a host to write data to or read data from data storage units controlled by the storage controller. The hosts and the storage controller frequently communicate with each other through host ports through which signal paths between the various hosts and the storage controller pass. A connection fabric often provides the connections between the hosts and the host ports. The connections of the connection fabric may be configurable by appropriate settings of switches or other devices to connect specific hosts to specific host ports. Other types of connection fabrics may have fixed paths to connect specific hosts to specific host ports.

The data is frequently stored in the storage units in units of data often referred to as a "storage volume." Each storage volume is typically assigned one or more host ports. The assignments of specific storage volumes to specific host posts may be represented by a volume to host port mapping. The mapping of a storage volume to a host port permits data read from that volume to be transferred through the host port to which it is mapped. If a host is assigned to a host port which is mapped to the storage volume, the host may receive the read data through the host port mapped to the storage volume. Conversely, the mapping of a storage volume to a host port permits write data from a host assigned to a host port which is mapped to the storage volume, to be transferred through the host port to which the storage volume is mapped.

A storage controller is typically configured and administered by a user through a storage management system operating on the storage controller. Such management systems typically includes a user interface such as a graphical user interface (GUI) which facilitates such configuration and administration. In one type of such management system, the management system maintains in a database, system configuration data identifying which storage volume (or groups of storage volumes) are mapped to a particular host port, but often do not maintain system configuration data identifying which storage volume or host port is connected to which host. Other types of management systems for storage controllers maintain both types of system configuration data, not only system configuration data identifying which storage volume (or groups of storage volumes) is mapped to a particular host port, but are also capable of maintaining system configuration data identifying which storage volume or host port is connected to which host. Accordingly, if a user migrates from the one type to the other type of management system, system configuration data identifying which storage volume or host port is connected to which host may not have been maintained by the prior management system.

SUMMARY

In one embodiment of a storage management system employing a management interface in accordance one aspect of the present description, a user interface is provided to facilitate assigning host ports to an associated host in a computing system having a server and one or more hosts. In one aspect, the user interface detects unassigned host ports which have not been identified as being assigned to an associated host, and generates a graphical user interface (GUI) page indicating unassigned host ports. User selection of at least one of the unassigned host ports indicated in the GUI page is received as well as user selection of a host, to assign to the selected unassigned host ports. Once the assignment is completed, data structures storing host port assignment configuration data are updated to indicate the host assigned to the selected host ports.

In one aspect, in response to the detecting of unassigned host ports, a user is invited to assigned unassigned host ports. In one embodiment, the invitation is in the form of a pop-up window which interrupts use of the storage management interface by the user.

In another aspect, the invitation is in the form of a message on a GUI page for managing hosts, wherein the message indicates that host ports remain unassigned and invites a user to assigned unassigned host ports.

Other features and aspects are described.

DETAILED DESCRIPTION

One aspect of the present description provides a management interface, such as a graphical user interface, for example, for a storage management system for a server, which can facilitate migration from an earlier generation of a storage management system. For example, as previously mentioned, some earlier generation storage management systems often do not maintain system configuration data identifying which storage volume (or group of storage volumes) or host port is assigned to which host. Other types of storage management systems for servers maintain both types of system configuration data, not only system configuration data identifying which storage volume (or group of storage volumes) is mapped to a particular host port, but are also capable of maintaining system configuration data identifying which storage volume (or group of storage volumes) or host port is connected to which host.

As explained in greater detail below, a storage management system employing a management interface in accordance with the present description, can facilitate obtaining system configuration data identifying assignments of host ports to hosts. Accordingly, migration from an earlier generation storage management system to one which can maintain system configuration data identifying which storage volume (or group of storage volumes) or host port is connected to which host, may be facilitated. Other aspects may be realized, depending upon the particular application.

Figure 1:
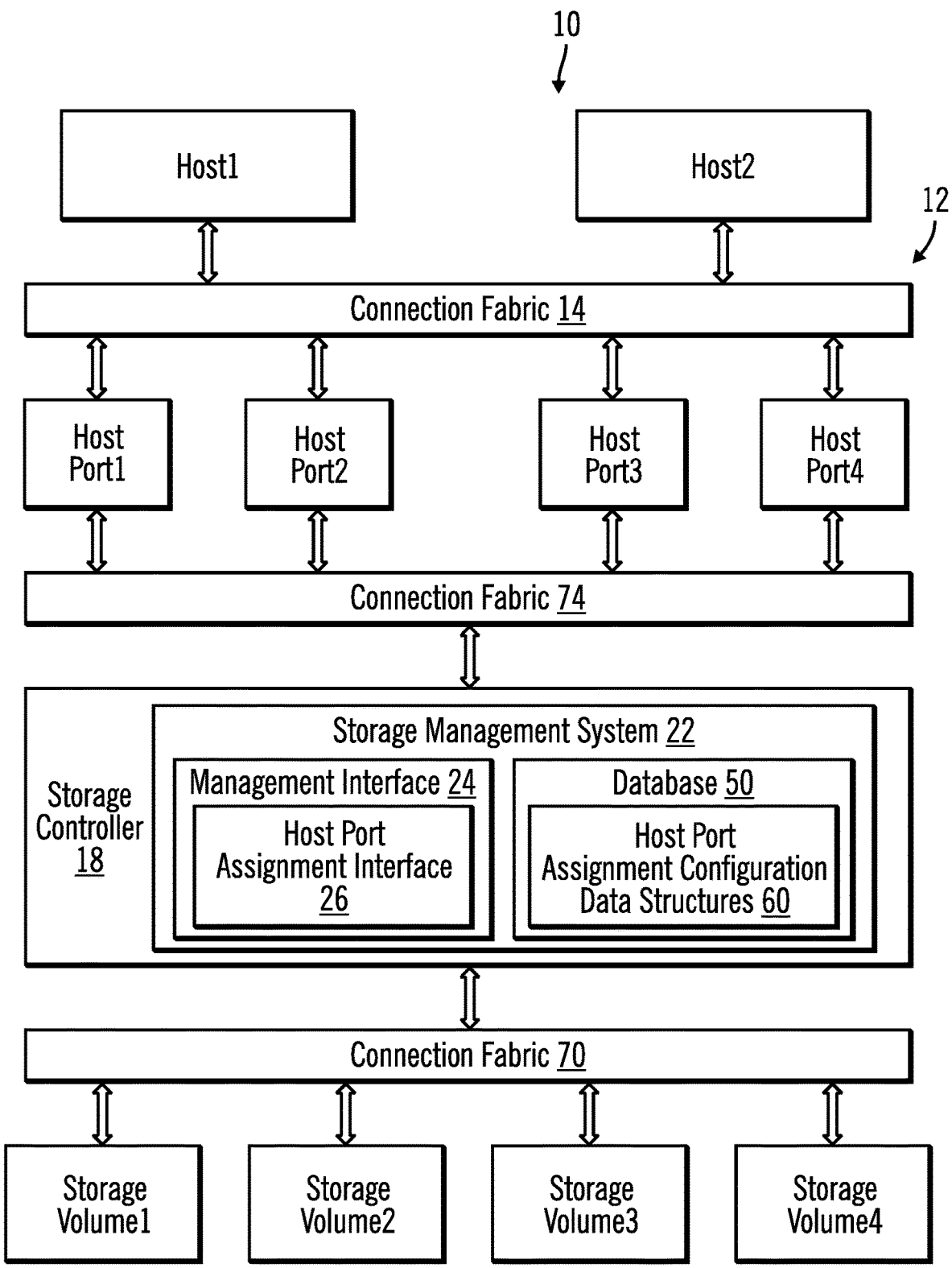
FIG. 1 illustrates an embodiment of a storage environment.

FIG. 1 illustrates one embodiment of a storage environment 10 employing a management interface for host port assignment in accordance with the present description. The environment 10 includes a computing system including a server 12 and a plurality of hosts as represented by the hosts, host1, host2, etc. Although the drawing of FIG. 1 depicts two such hosts for simplicity sake, it is appreciated that a storage environment may have a fewer or greater number of hosts, depending upon the particular application. Moreover, although a management interface for host port assignment in accordance with the present description, is described in connection with hosts, it is appreciated that a management interface for host port assignment in accordance with the present description is also applicable to assigning host ports to hosts which are treated as a group of hosts often referred to as host clusters.

The server 12 may comprise a modified version of an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world). The server 12 is modified to provide a storage management system employing a management interface in accordance with the present description.

A connection fabric 14 interconnects specific hosts to specific host ports, hostport1, hostport2, hostport3, hostport4, etc., of the server 12, which have been assigned to the specific hosts, Thus, host ports hostport1 and hostport2 may be assigned to host1 and host ports hostport3 and hostport4 may be assigned to host2, for example. The connection fabric 14 includes various connection devices for connecting each host port to its assigned host so that there is a signal path connecting a host port to its assigned host. Such connection devices may include cables including wire or fiber optic cables, switches, wireless transmitters and receivers, busses, networks, routers etc., depending upon the particular application. A signal path between a host port and its assigned host is typically achieved by configuring appropriate connection devices. Such configuration may be done physically or through appropriate software, depending upon the particular application. It is appreciated that a host may be assigned to more than one host port and in some applications, a host port may be assigned to more than one host.

The server 12 includes a storage controller 18 which controls one or more data storage units such as disk drives, tape storage, solid state memory, etc., a As explained in greater detail below, the storage controller 18 includes a storage management system 22 employing an embodiment of a management interface 24 having a host port assignment interface 26 in accordance with the present description. The storage management system 22 provides for configuring and administering the storage controller 18 and the storage volumes volume1-volume4. The storage management system 22 maintains a database 50 which includes data structures 60 which store the system configuration data obtained through the host port assignment interface 26 for identifying host port assignments to the associated hosts.

Data is stored within a data storage unit as units of data which may be storage volumes, for example. Storage volumes may also be grouped in a group of storage volumes and treated as a group for mapping and other management purposes. Other examples of units of data stored within a data storage unit are tracks, cylinders, allocation units, extents, etc. Such data units are represented in FIG. 1 as storage volume1, storage volume2, storage volume3, storage volume4, etc. Although the storage environment of FIG. 1 is depicted as including four such storage volumes for simplicity, it is appreciated that a storage environment may have more or fewer such data units, depending upon the particular application. Moreover, although the data units are depicted as storage volumes, it is appreciated that other types of data units may be utilized in a user interface for host port assignment in accordance with the present description.

A connection fabric 70 interconnects storage controller 18 to the storage volumes volume1-volume4 of the data storage units. Similarly, a connection fabric 74 interconnects storage controller 18 to the host ports hostport1-hostport4 so that there are signal paths connecting the storage controller to each of the host ports hostport1-hostport4. The connection fabric 70, like the connection fabric 14 includes various connection devices for connecting the storage controller to each storage volume volume1-volume4. Similarly, the connection fabric 74 includes various connection devices for connecting the storage controller to each host port hostport1-hostport4 so that there are signal paths connecting the storage controller to each host port hostport1-hostport4. Such connection devices again, may include cables including wire or fiber optic cables, switches, wireless transmitters and receivers, busses, networks, routers etc., depending upon the particular application. A signal path between the storage controller and a host port or storage volume is typically achieved by configuring appropriate connection devices. Such configuration may be done physically or through appropriate software, depending upon the particular application.

One or more of the connection fabrics 14, 70, 74 may comprise a Storage Area Network (SAN), Local Area Network (LAN), Intranet, the Internet, Wide Area Network (WAN), peer-to-peer network, wireless network, arbitrated loop network, etc. The storage volumes are stored in storage units which may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as secondary servers, secondary storages, active and suspended copy relationships, etc., are shown, there may be any number of these components.

As previously mentioned, storage management systems frequently maintain system configuration data identifying which storage volume (or group of storage volumes) is mapped to which host port. In the embodiment of FIG. 1, system configuration data identifying mappings of a storage volume (or group of storage volumes) to host ports may be maintained in the database 50 maintained by the storage management system 22.

Figure 2:
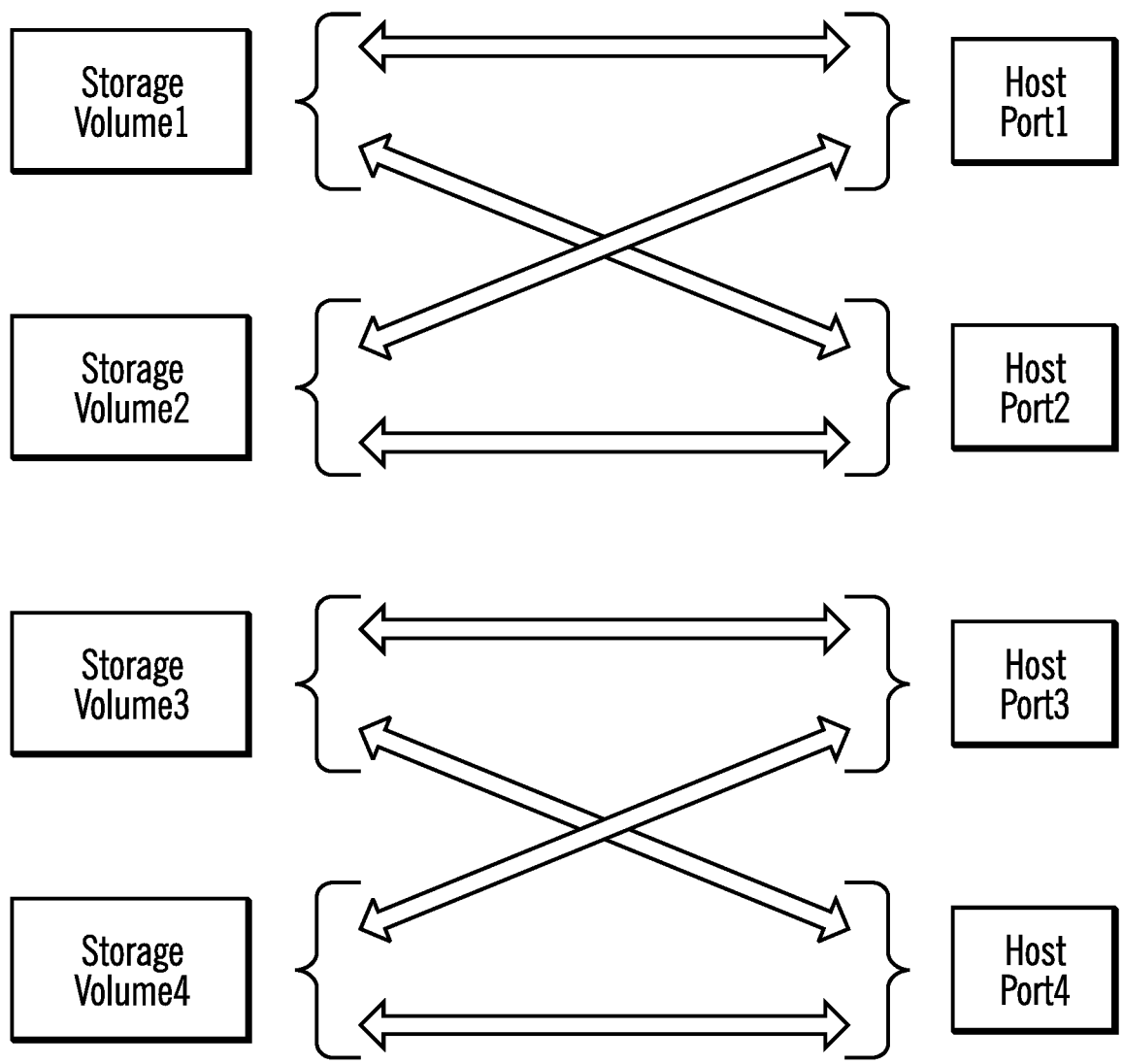
FIG. 2 illustrates an example of mappings of storage volumes to host ports.

FIG. 2 depicts one example of such a mapping between storage volumes and host ports. Thus, in the example of FIG. 2, the storage volume1 is depicted as being mapped to both host port hostport1 and host port hostport2. Accordingly, appropriate signal paths are provided by the storage controller and the connection fabrics so that write data from host port hostport1 can be directed to storage volume 1, and conversely, read data from storage volume1 can be directed to host port hostport1, for example. Signal paths are similarly provided between storage volume1 and host port hostport2 to which storage volume1 has also been mapped. However, because storage volume1 has not been mapped to other host ports such as host port hostport3 or host port hostport4 in this example, signal paths between storage volume1 and host port hostport3 or host port hostport4 are not provided. Hence, the storage environment has not been configured for data transfers between storage volume1 and the host ports hostport3 and hostport4.

In the event that host port hostport1 fails, for example, it is noted that storage volume1 would still be able to communicate with host port hostport2 to which storage volume1 is also mapped. However, in those prior generation storage management systems which do not maintain system configuration data identifying to which host or hosts particular host ports have been interconnected, it may not be readily apparent to the storage management system or an administrator using the management system, the specific host to which storage volume1 continues to have a data path notwithstanding the failure of host port hostport1.

To avoid such problems, a storage management system may be acquired by a user, which has (or may be upgraded to have) the capability of storing system configuration data identifying to which host or hosts, each host port has been assigned. Thus, if the storage management system contains system configuration data identifying that host port hostport1 has been assigned to host1, for example, the storage management system can indicate that failure of host port hostport1 has caused loss of the data path from storage volume1 to host1 via host port hostport1.

Figure 3:
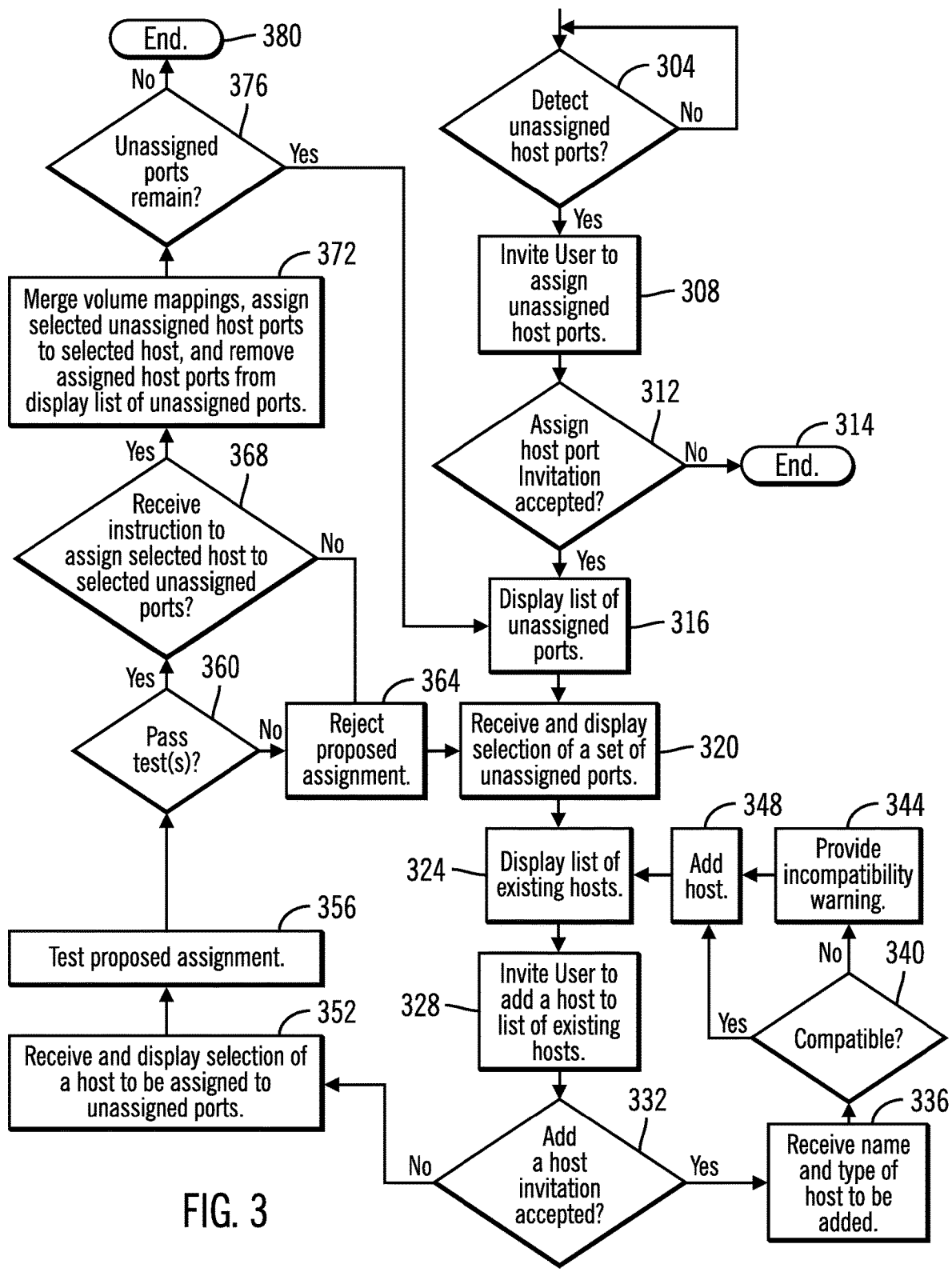
FIG. 3 illustrates an embodiment of operations of storage management system employing a management interface in accordance one aspect of the present description.
Figure 4:
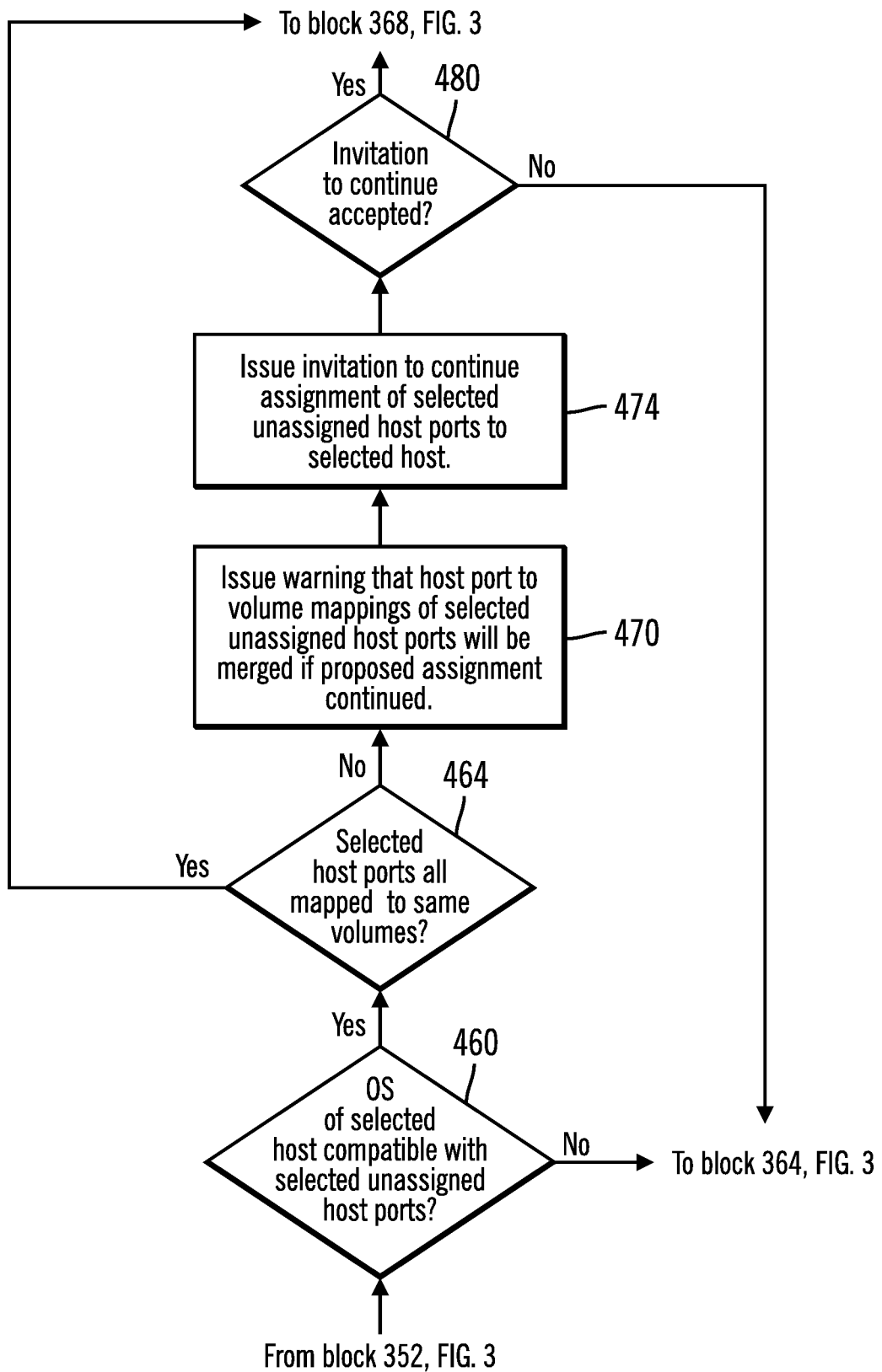
FIG. 4 illustrates a more detailed embodiment of operations of FIG. 3.

In accordance with one aspect of the present description, the host port assignment interface 26 (FIG. 1) facilitates the entry into the storage management system 22, of system configuration data identifying which host or hosts, each host port has been assigned. FIGS. 3, 4 depict examples of operations of a host port assignment interface such as the host port assignment interface 26 of the management interface 24 of the storage management system 22, for obtaining host port assignment configuration data in accordance with the present description. Such host port assignment configuration data obtained through the host port assignment interface 26 (FIG. 1), and identifying which host or hosts, each host port has been assigned, may be stored in suitable host port assignment configuration data structures 60.

The host port assignment interface operations depicted in FIGS. 3, 4 may be performed by at least one of or a combination of at least two of hardware, software, or firmware. In one embodiment, the host port assignment interface 26 is a part of the storage management system 22 for the storage controller 18. It is appreciated that one or more of the operations of the host port assignment interface may be performed by hardware, software, firmware or combinations thereof in other devices, in whole or in part, such as one or more of the hosts, depending upon the particular application.

In one operation, a determination (block 304, FIG. 3) is made as to whether the system configuration data stored by the management system for the server identifies host ports but does not identify the host assigned to one or more host ports identified by the system configuration data. If the management system such as the storage management system 22, for example, detects (block 304) (as indicated by the system configuration data stored in the host port assignment data structures 60) that there are host ports which have not been assigned to a host, that is, remain "unassigned," the host port assignment interface of the management system invites (block 308) the user to assign the unassigned host ports to a host.

For example, the host ports identified by the system configuration data may have in fact been connected by a connection fabric to an associated host but the management system has not yet been informed of that connection. Alternatively, host ports may have been added to the storage environment but have in fact not yet been connected to any host. Host ports assignments to a host that have not been entered through the host port assignment interface 26, are unknown to the host port assignment interface 26, and are referred to herein as "unassigned" host ports whether or not an "unassigned" host port may have in fact already been connected to a host by a data path. Thus, host ports having no data path connections to a host, and host ports having data path connections to a host, which are unknown to the system management, are both referred to herein as "unassigned" host ports since, insofar as the host assignment interface 26 is concerned, the host ports having no data path connections or an unknown data path connection to a host, are considered "unassigned."

Figure 5:
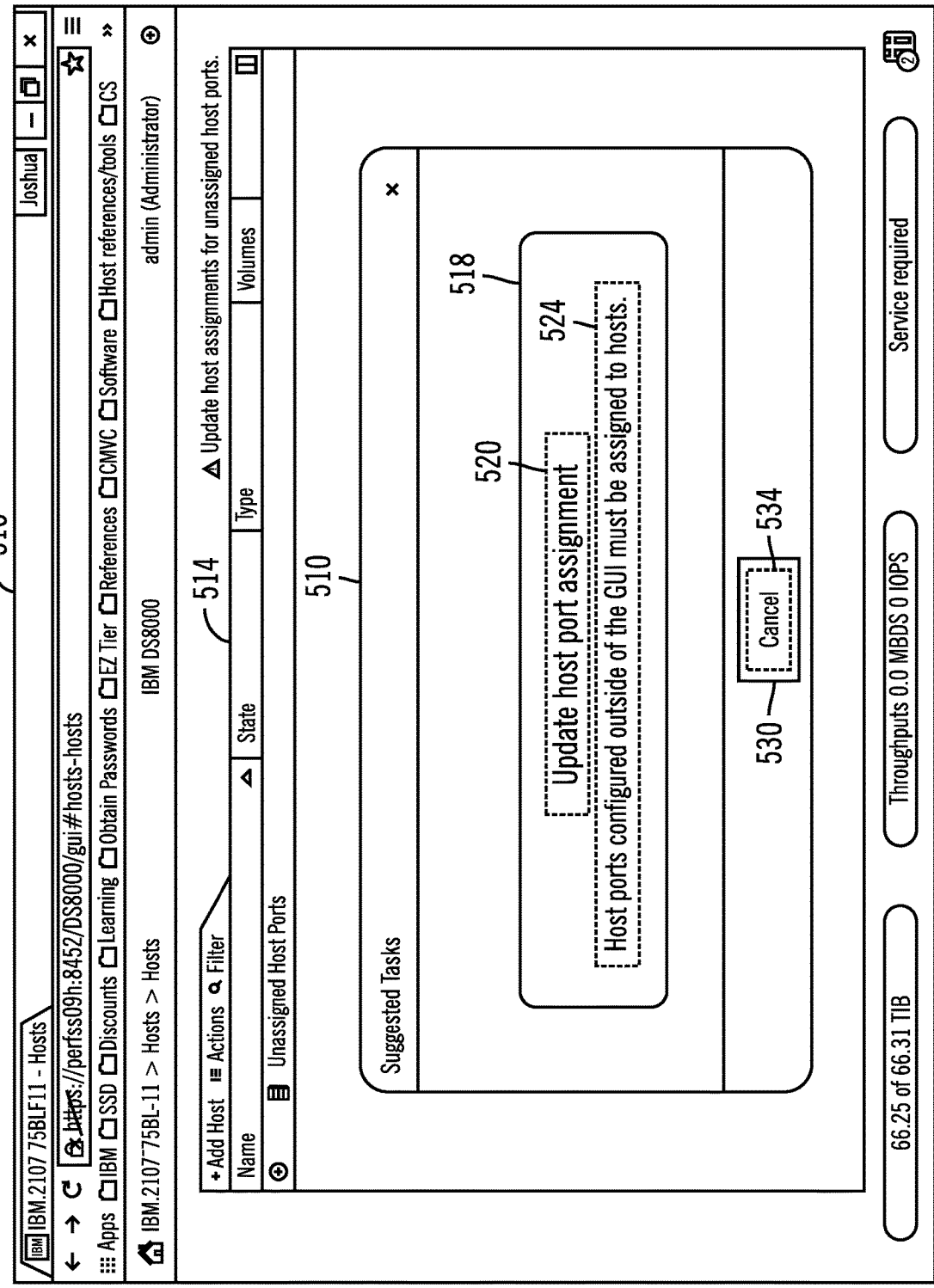
FIG. 5 illustrates an embodiment of an invitation to update host port assignments in a host port assignment interface of a management interface in accordance one aspect of the present description.

FIG. 5 shows an example of an invitation (block 308, FIG. 3) by the host port assignment interface to a user to assign unassigned host ports. In this example, the management interface 24 and the host port assignment interface 26 generate a graphical user (GUI) interface which includes various GUI display elements displayed on a display 502 (FIG. 5), including GUI windows and pages, for example. Displayed within windows and pages are various other GUI display elements including tabs, display indicia and virtual input buttons for users. Accordingly, the invitation (block 308, FIG. 3) to a user to assign unassigned host ports, in this embodiment is a prompt in the form of a pop-up window 510 of the host port assignment GUI of the interface 26 (FIG. 1). In this embodiment, the pop-up window prompt 510 is automatically given to the user by the host port assignment interface 26 when both 1) the user first enters a host configuration page 514 overlaying a host page 516 of the system management GUI of the management interface 24, and 2) unassigned host ports have been detected (block 304, FIG. 3). The host configuration page 514 and the underlying host page 516 of the system management GUI of the management interface 24 receive various user inputs and display various data concerning the hosts including host configuration data.

The host port assignment interface receives (block 312) user inputs indicating whether the user accepts the invitation (block 308) to assign unassigned ports to one or more hosts. In the embodiment of FIG. 5, the pop-up window prompt 510 of the host port assignment GUI includes a virtual input button 518 which when "clicked" on by the user, accepts (block 312, FIG. 3) the invitation to initiate or resume the host port assignment process. As used herein, the term "clicked" refers to user selection by a suitable input device such as a touch screen or touch pad input device or pointing device, for example. The invitation acceptance button 518 displays invitation indicia 520 labeling the button 518 with informational text such as "Update host port assignment" to invite the user to begin or resume the processing of assigning host ports to hosts. The pop-up window prompt 510 may include further label indicia such as informational indicia 524 providing helpful explanatory information to the user concerning the host port assignment process. For example, the informational indicia 524 may explain to the user that host ports configured outside the host port assignment interface 26 should be assigned to hosts.

In this embodiment, it is assumed by the system management interface that when a user enters the host configuration page 514 of the system management interface that the user is attempting to manage hosts. In one embodiment, it is a condition of the storage management system 22 that host ports must be assigned to hosts before volumes (or volume groups) can be mapped to hosts using the system management interface. Accordingly, the prompt window 510 is a very strong, that is, prominent prompt in this embodiment, occupying 5-30% of the host page 514. Further, the prompt window 510 pops-up automatically, interrupting the user attempting to access the host configuration page 514. However, it is appreciated that in other embodiments, mapping of volumes (or volume groups) may be permitted before the host ports are assigned to host. Also, the prominence of the prompt window 510 may vary, depending upon the particular application.

In this embodiment, the user is given the option of rejecting (block 312) the strong prompt pop-up window invitation 510 to assign unassigned host ports. For example, the user may click on a virtual input button 530 of the prompt window 510 displaying a label of suitable rejection indicia 534 such as the term "cancel" which terminates (block 314, FIG. 3) the current host port assignment process of the host port assignment interface. In this embodiment, if the user cancels the suggested initiation or resumption of the host port assignment task, the strong pop-up window prompt 510 is not displayed again as it is assumed that the user understands that the management system 22 (FIG. 1) is recommending that the user update the host port assignment configuration data.

Figure 6:
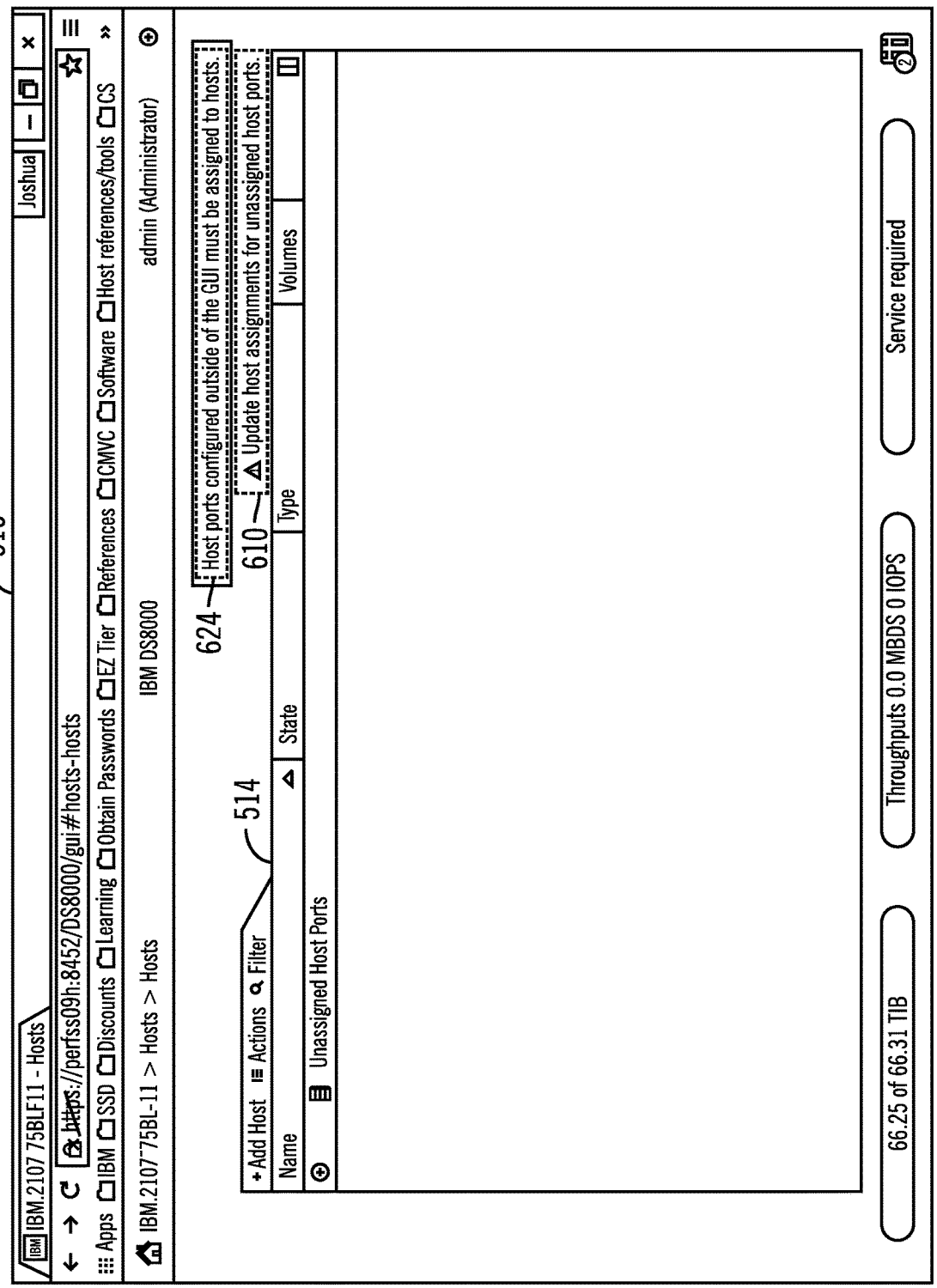
FIG. 6 illustrates another embodiment of an invitation to update host port assignments in a host port assignment interface of a management interface in accordance one aspect of the present description.

In addition to the strong pop-up window prompt 510, the host port assignment GUI of the host port assignment interface 26 provides other opportunities for the user to initiate or resume a host port assignment process. For example, FIG. 6 shows indicia 610 indicating a table status message displayed by the host port assignment GUI of the host port assignment interface 26 when the host configuration page 514 is accessed. The table status message has indicia 610 alerting the user that the user should update host assignments for unassigned host ports. In addition, informational indicia 624 provide helpful explanatory information to the user concerning the host port assignment process. For example, the informational indicia 624 in a manner similar to the indicia 524 (FIG. 5) may explain to the user that host ports configured outside the host port assignment interface should be assigned to hosts. The indicia 610, 624 provide additional warning feedback to the user that unassigned host ports should be assigned to the appropriate host. In this embodiment, the indicia 610, 624 are displayed in response to detection of unassigned host ports when the user accesses the host configuration page 514. It is appreciated that such warning feedback may be provided at other GUI pages of the host port assignment interface and the system management interface such as pages concerning storage volumes, for example. In a manner similar to the virtual input button 518 (FIG. 5), the status message indicia 610 also functions as a virtual user input button and an invitation (block 308, FIG. 3) to the user to initiate or resume a host port assignment processes. Accordingly, when the status message indicia 610 is clicked on by the user, the host port assignment interface receives the user's acceptance (block 312, FIG. 3) of the invitation to initiate or resume the host port assignment process.

Figure 7:
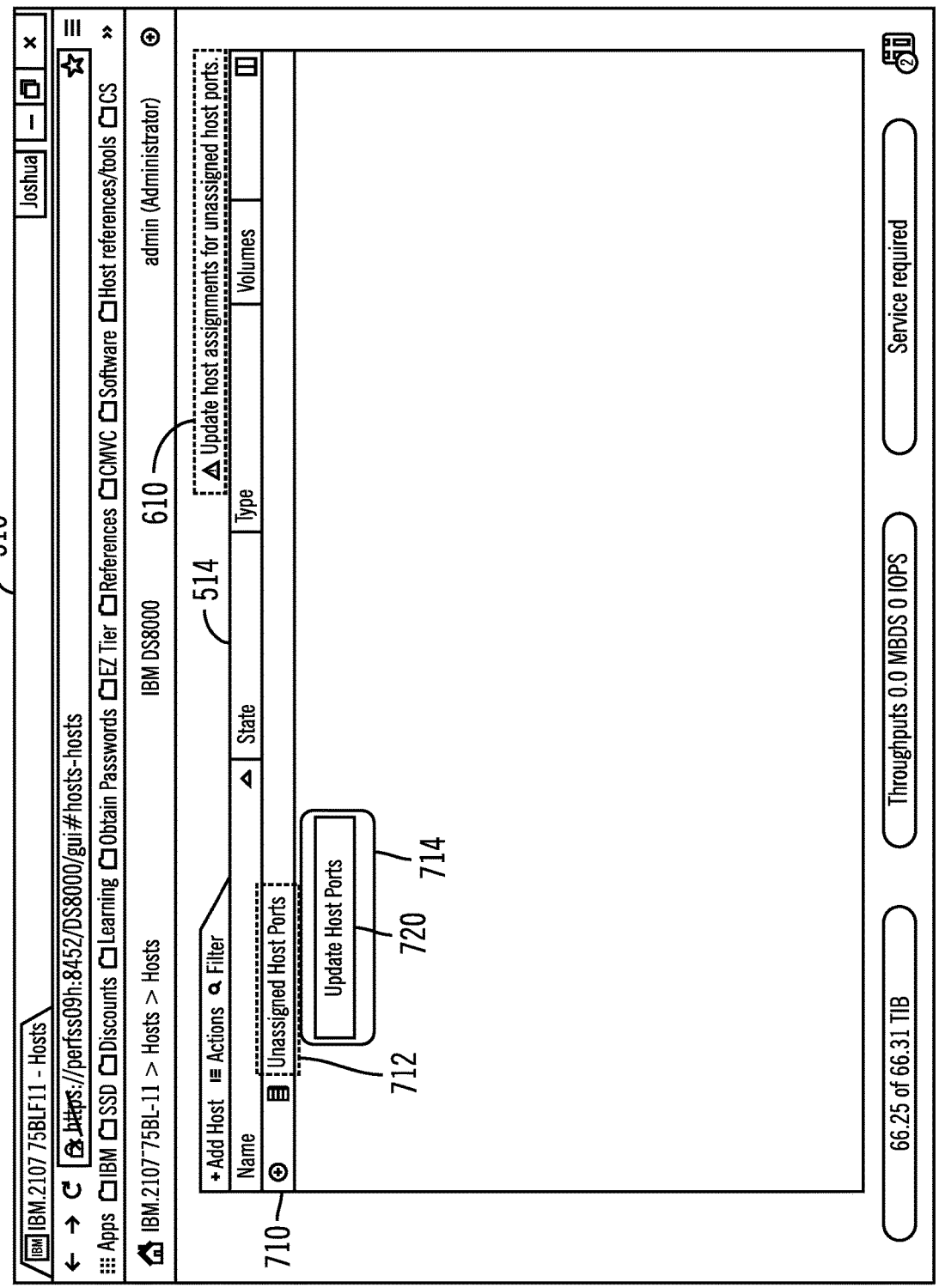
FIG. 7 illustrates yet another embodiment of an invitation to update host port assignments in a host port assignment interface of a management interface in accordance one aspect of the present description.

In the illustrated embodiment, the host port assignment interface GUI of the host port assignment interface 26 provides yet another opportunity for the user to initiate or resume a host port assignment process. More specifically, as best seen in FIG. 7, the host configuration page 514 of the management interface GUI of the management interface 24 includes a table having an unassigned host ports row 710 which is displayed if unassigned host ports are detected (block 304, FIG. 3). The row 710 includes indicia 712 such as the label "Unassigned Host Ports" for example, indicating that the row 710 relates to unassigned host ports. In this embodiment, the unassigned host ports row 710 is a portion of the host ports assignment interface GUI of the interface 26. Accordingly, the user may then select as an action, initiating or resuming a host port assignment process. This may be done by, in one embodiment, the user clicking on the unassigned host ports row 710, causing a virtual user input button 714 to appear which is similar to the virtual button 518 of FIG. 5. By clicking the virtual input button 714, the user accepts (block 312, FIG. 3) the invitation to initiate or resume the host port assignment process. The invitation acceptance button 714 displays invitation indicia 720 labeling the button 714 with indicia such as "Update host ports" to invite the user to begin or resume the processing of assigning host ports to hosts.

Figure 8:
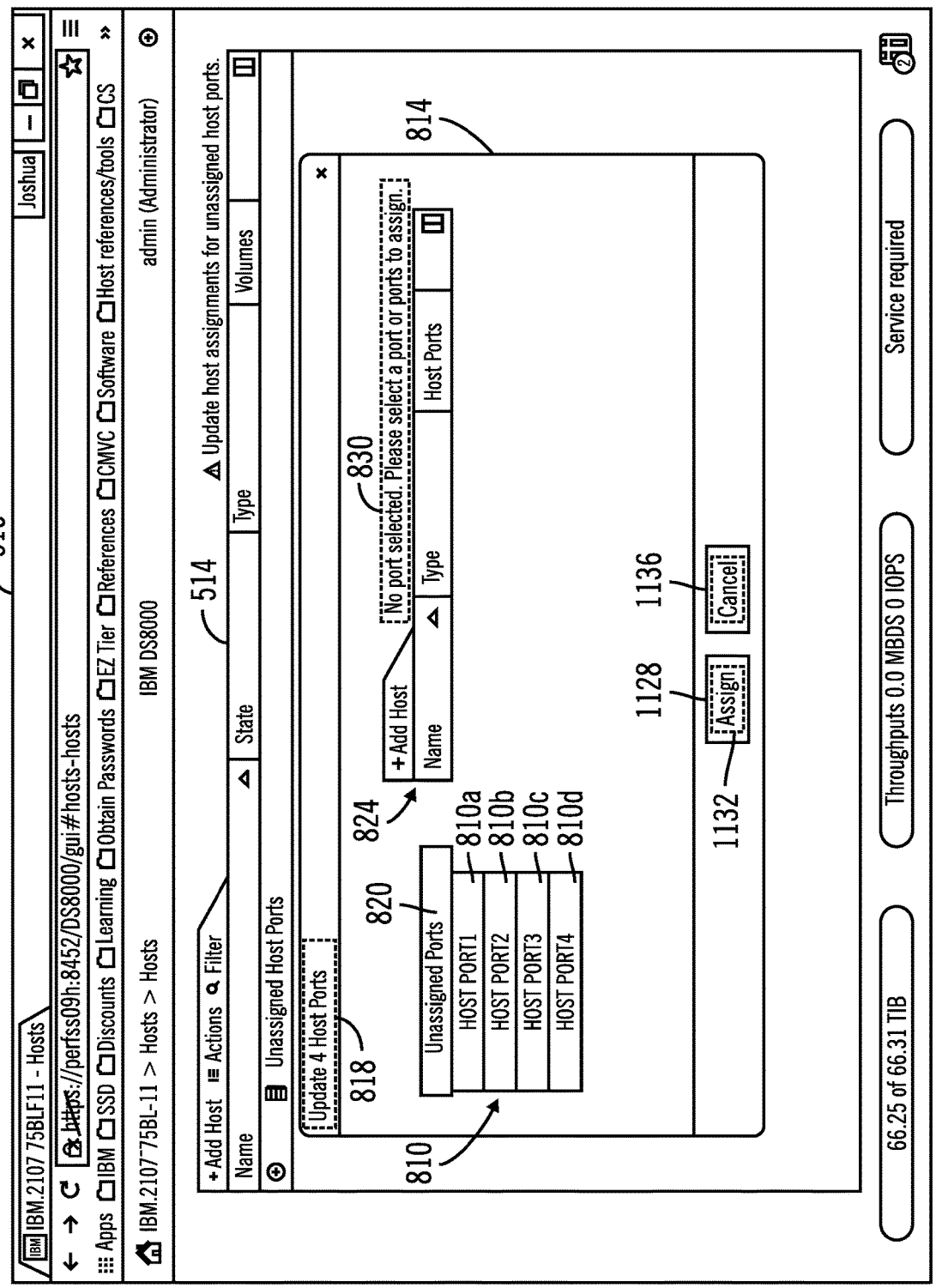
FIG. 8 illustrates an embodiment of a host port assignment interface of a management interface in accordance one aspect of the present description, listing unassigned host ports.

If the host port assignment interface receives (block 312, FIG. 3) the user's acceptance of the invitation (block 308) to assign the unassigned host ports to a host or hosts, the host port assignment interface GUI displays (block 316) a list of unassigned ports. FIG. 8 shows an example of such a list of host ports which are detected as being currently unassigned as indicated by the host port assignment configuration data structures 60 (FIG. 1). In the embodiment of FIG. 8, the list of unassigned host ports is indicated by indicia 810 of a host port assignment dialog pop-up window 814 of the host port assignment GUI. The host port assignment dialog window 814 includes indicia 818 which label the host port assignment dialog window 814 with a suitable informational label such as "Update 'N' Host Ports" where the variable N is replaced by the number of unassigned host ports detected. In the example of FIG. 8, four host ports, Hostport1, Hostport2, Hostport3, Hostport4 have been detected as unassigned and are listed by list entry indicia 810a, 810b, 810c, 810d, respectively of the list entry indicia 810. Accordingly, the informational label indicia 818 in this example informs the user to "Update 4 Host Ports". It is appreciated that the number of detected unassigned ports may vary, depending upon the particular application. The host port list indicia 810 of this embodiment also include informational list header indicia 820 labeling the column of list entry indicia 810a, 810b, 810c, 810d, as "Unassigned Ports".

In another operation, the host port assignment GUI of the host port assignment interface, receives (block 320) a user selection of one or more host ports of the displayed list of unassigned host ports, for assignment to an associated host. In the illustrated embodiment, each of the host port list entry indicia 810a, 810b, 810c, 810d also functions as a user virtual input button, which when clicked on by the user, selects the associated host port for host port assignment. It is appreciated that other display elements may be used to select a displayed host port such as check boxes and check dots, for example.

Figure 9:
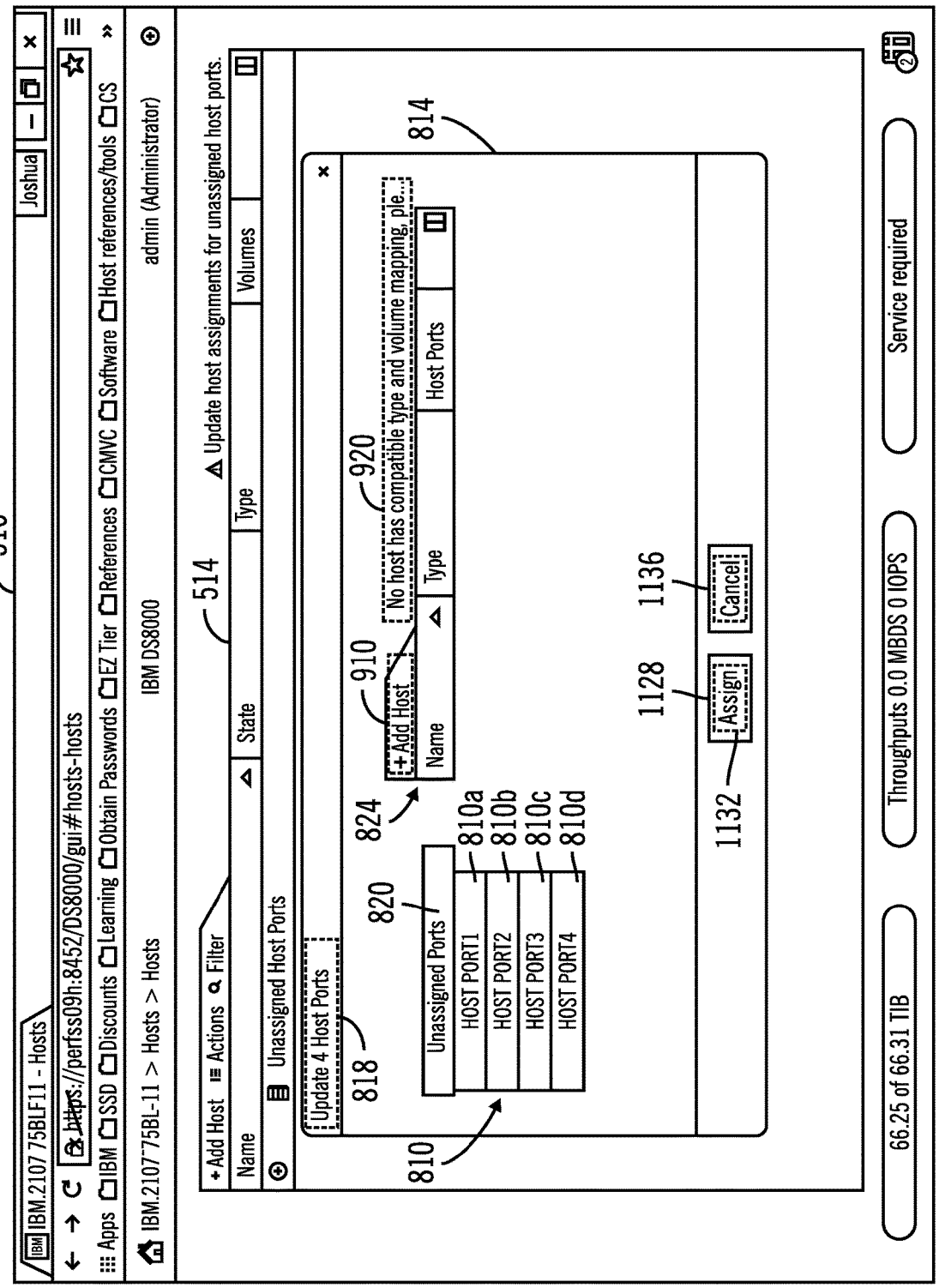
FIG. 9 illustrates an embodiment of a host port assignment interface of a management interface in accordance one aspect of the present description, indicating unassigned host ports selected for assignment to a host.

The host port assignment interface displays (block 320, FIG. 3) an indication of which host ports of the list of unassigned host ports have been selected by the user for host port assignment. As shown in FIG. 9, selection of an unassigned host port for host port assignment is indicated by the host port assignment GUI by changing the background color of the host port list entry indicia. Thus, in the example, of FIG. 9, the unassigned host ports, hostport1, and hostport2, have been selected by the user for host port assignment as indicated by the darker background of the host port list entry indicia 810a, 810b as compared to the lighter background of the host port list entry indicia 810c, 810d for the unselected host ports, hostport3, hostport4. It is appreciated that selection of an unassigned host port for host port assignment may be indicated in other techniques, depending upon the particular application. For example, check boxes or check dots may be filled in or overlaid with a suitable character indicia such as a check mark, for example.

In the embodiment of FIG. 8, the host port assignment pop-up dialog window 814 is triggered by the user accepting the host port assignment invitation via the user input button 518 (FIG. 5), the message user input button 610 (FIG. 6) or the user input button 714 (FIG. 7). However, it is appreciated that other events in the system management interface 24 or host port assignment interface 26 may trigger a host port assignment dialog window or page to conduct the host port assignment process.

In one embodiment, the selection of unassigned host ports for host port assignment is limited to host ports which the user knows belong to a single host. Thus, in the illustrated example, the user knows that the host ports, hostport1 and hostport2 belong to a single host, that is, data paths have been established between a single host and each of the host ports, hostport1 and hostport2. It is appreciated that in other embodiments, host ports may belong to more than one host, depending upon the particular application.

In addition to the list of unassigned host ports as indicated by the indicia 810, the host port assignment pop-up dialog window 814 (FIG. 8) also displays (block 324, FIG. 3), a list of all the currently defined hosts of the storage environment, as indicated by host list indicia 824. However, in this embodiment, input functions of the host list indicia 824 are disabled until the user selects one or more host ports for assignment to a host. In the embodiment of FIG. 8, such disablement of the input functions of the host list indicia 824 is indicated by greying out the host list indicia 824. In addition, message indicia 830 provide a warning and instructional message such as "No port selected. Please select a port or ports to assign" for example. It is appreciated that in other embodiments, disablement of input functions of the host list indicia 824 may be indicated by other modifications or additions to the host list indicia 824. In further embodiments, input functions of the host list indicia 824 may remain enabled before the user selects one or more host ports for assignment to a host.

The host port assignment GUI of the host port assignment interface invites (block 328) a user to add a host to the list of currently defined hosts. As previously mentioned, in this embodiment, input functions of the host list indicia 824 are disabled until the user selects one or more host ports for assignment to a host. Once the user has selected host ports for host port assignment as indicated for the host ports hostport1, and hostport2 of FIG. 9, the host list indicia 824 are enabled for input functions by the host port assignment interface. In the embodiment of FIG. 9, such enablement of the input functions of the host list indicia 824 is indicated by lack of greying out of the host list indicia 824. In addition, a user input button 910 when clicked on by the user, initiates the process of adding a host to the list of currently defined hosts as indicated by the display indicia 824. The user input button of the host port assignment pop-up dialog window 814 has suitable label indicia such as "Add host", for example, to indicate to the user the process initiated by activating the user input button 910.

Once one or more host ports have been selected for host port assignment, the user has the option of either adding a new host or selecting a currently defined host already present on the list of the indicia 824. In the example of FIG. 9, there are no currently defined hosts at this point as indicated by empty fields of the host list indicia 824. Accordingly, in this example, the user accepts (block 332. FIG. 3) the invitation to add a host to the list of existing and currently defined hosts.

Figure 10:
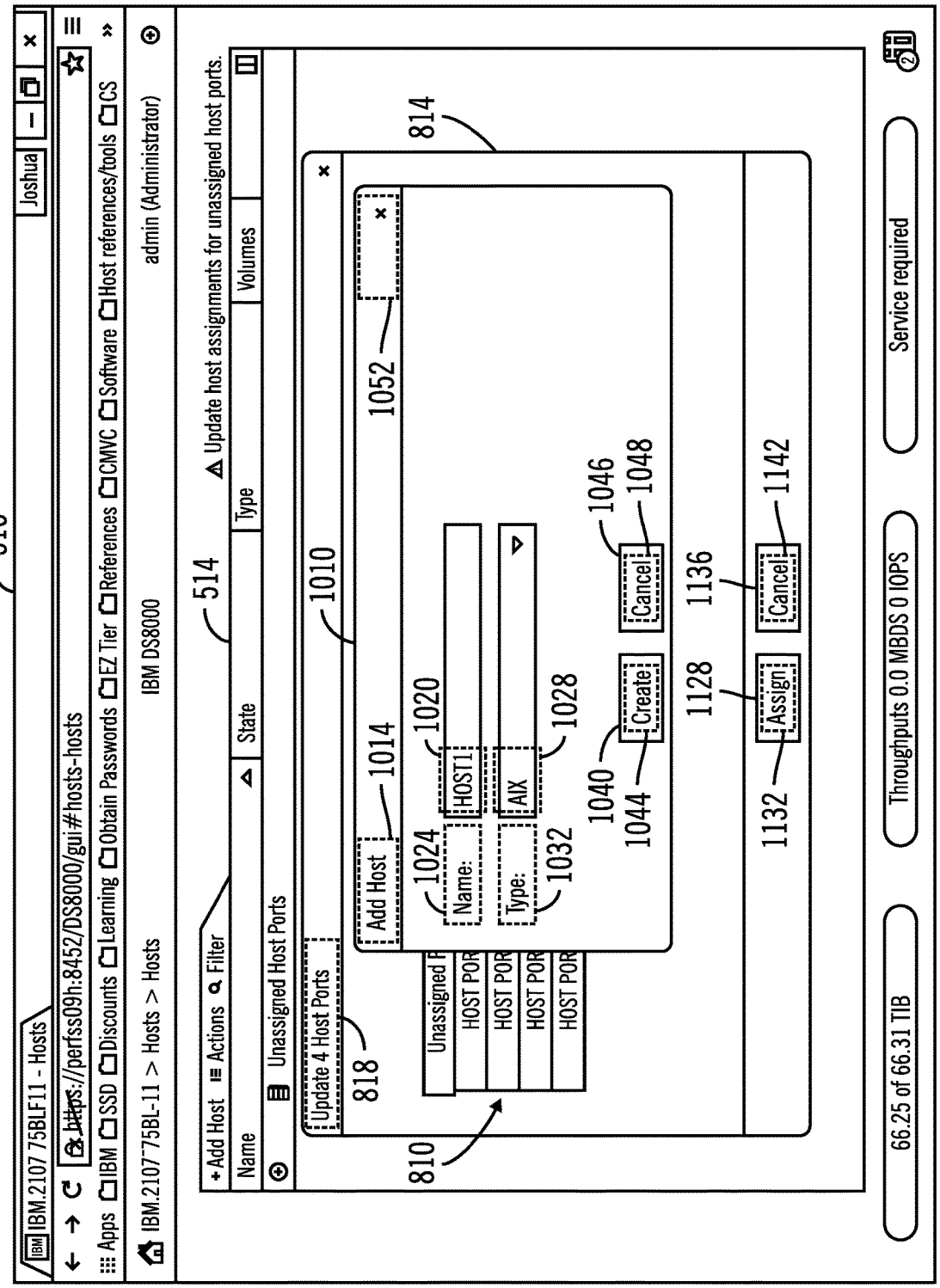
FIG. 10 illustrates an embodiment of a host port assignment interface of a management interface in accordance one aspect of the present description, for adding a representation of a host to the host port assignment interface.

In response to the acceptance of the invitation to add a host, the host port assignment interface receives (block 336, FIG. 3) appropriate identification data identifying the host selected by the user. In the illustrated embodiment of FIG. 10, the host port assignment GUI of the host port assignment interface displays a pop-up user input dialog window 1010 for the add a host process as indicated by window label indicia 1014 which identify to the user, the purpose of the user input dialog window 1010 as "Add Host." Once the user input dialog window 1010 is open as shown in FIG. 10, the user may input in a text input field 1020 the name of the host to be added, as indicated by the label indicia 1024 adjacent to the text input field 1020 for inputting the name of the host to be added. In this example, the name of the host to be added is Host1 (FIG. 1). In addition, in this embodiment, the user may input in another text input field 1028 the type of the host to be added, as indicated by the label indicia 1032 adjacent to the text input field 1028 for inputting the type of the host to be added. For example, in one embodiment, the user may input the operating system, such as AIX, or Linux, for example, to identify further the type of the host desired to be added. It is appreciated that other information identifying the name or characteristics of the host to be added, may be received as well, in addition to or instead of those depicted in FIG. 10, depending upon the particular application. By clicking on a user input button 1040 having suitable identification label indicia 1044 such as the term "Create" for example, identifying to the user the function of the user input button 1040, the user may signal to the host port assignment interface that the host identification information entered through the user input dialog window 1010 is complete and may be received. In response to activation of the "Create" user input button 1040, the host port assignment interface receives the user inputted host identification data.

Once the host port assignment interface receives (block 336, FIG. 3) appropriate identification data identifying the host to be added, the identified host may be tested (block 340) by the host port assignment interface for compatibility with the host ports which were selected by the user in the manner described above in connection with FIG. 9. If it is determined (block 340) that the host to be added is not compatible with the selected host ports, the host port assignment interface in this embodiment, issues a warning message (block 334, FIG. 3) to the user that the host to be added is not compatible with the selected host ports. For example, if the operating system of the host to be added is different from that of the operating system of the selected host ports, the host to be added may be deemed to be incompatible with the selected host ports. Notwithstanding, that the host to be added is tested to be incompatible with the selected host ports, the host port assignment interface, in the illustrated embodiment, nonetheless permits the host to be added (block 348). Thus, in this embodiment, the host identified by the user as to be added, may be added (block 348) whether or not the host to be added is compatible with the host ports selected for host port assignment.

Conversely, if the user decides not to complete the proposed add a host process, the user may click on a "Cancel" input button 1046 having suitable informational text indicia 1048 such as the text "Cancel", for example, to indicate to the user the add a host process will be terminated by activating the user input button 1046. Alternatively, the user may click on the "X" window feature 1052 to cancel the add a host process. If the host port assignment interface receives (block 332, FIG. 3) an instruction to cancel rather than complete the proposed add a host process, the proposed add a host port process is cancelled the user is invited to continue (block 352) the host port assignment process.

Figure 11:
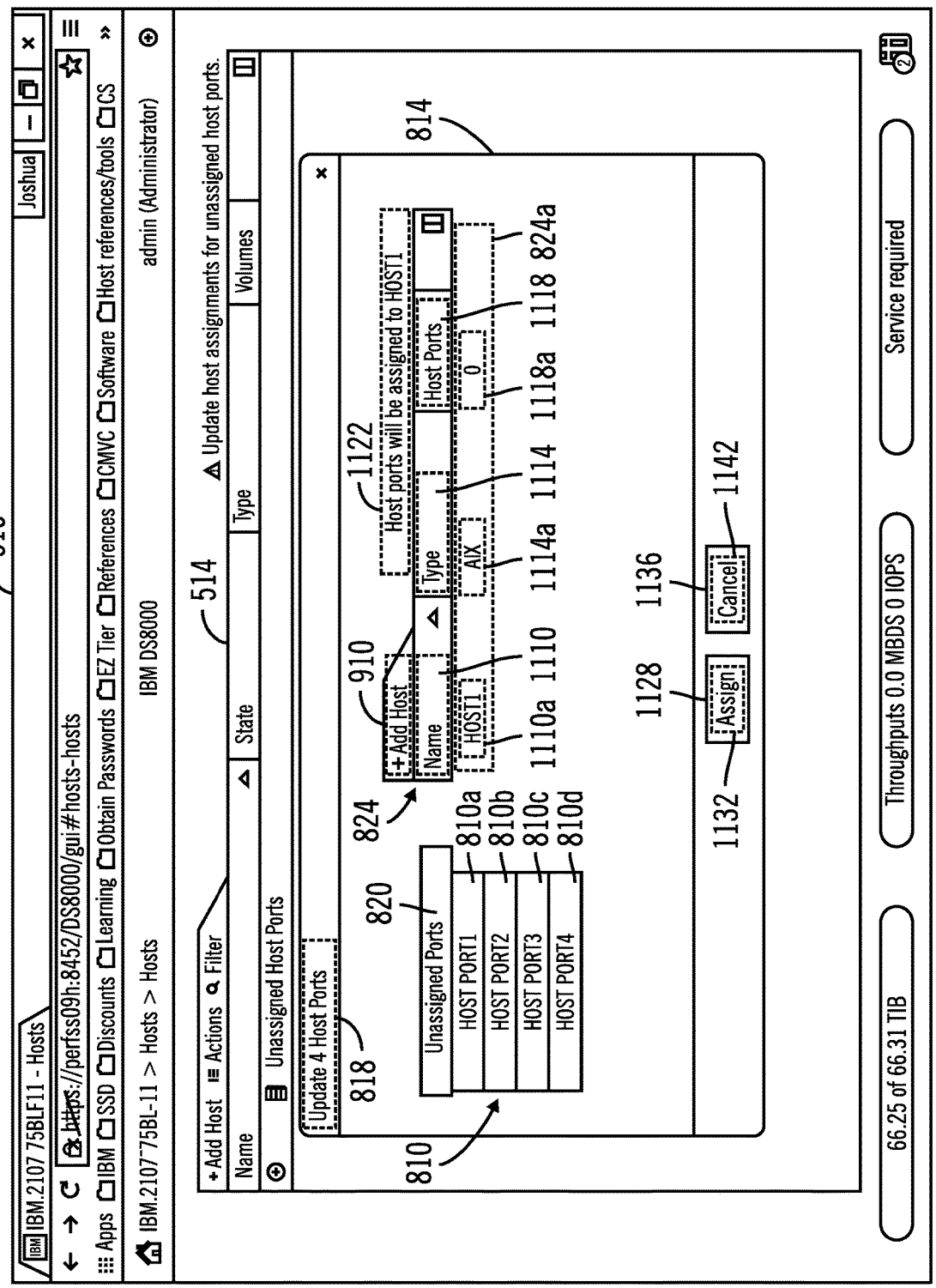
FIG. 11 illustrates an embodiment of a host port assignment interface of a management interface in accordance one aspect of the present description, listing currently identified hosts of the host port assignment interface.

FIG. 11 shows the state of the host port assignment pop-up dialog window 814 once a host has been added, in this example, Host1. As previously mentioned, the host port assignment interface displays (block 324, FIG. 3), a list of all the currently defined hosts of the storage environment, as indicated by host list indicia 824. Thus, in the example of FIG. 11, the host list indicia 824 includes a host list entry indicia 824a indicating that host Host1 is currently identified as a host in the storage environment.

In the illustrated embodiment, each host list entry indicia includes several fields including a host name field as indicated by host name indicia 1110, host type indicia 1114, and host ports indicia 1118. Thus, in the example of FIG. 11, the host list entry indicia 824a indicate that the added host is named Host1 as indicated by text indicia 1110a, is of a type AIX as indicated by text indicia 1128a and currently has zero host ports (as indicated by text indicia 1118a) assigned to it by the host port assignment interface.

If the user declines (block 332, FIG. 3) to add any further hosts in response to the invitation (block 328) and the display (block 324) of the currently identified hosts, the host port assignment interface receives (block 352) the user's selection of a host to be assigned to the selected unassigned host ports.

In the illustrated embodiment, each of the host list entry indicia 824a also function as a user input button in a manner similar to that of the host port list entry indicia 810a, 810b, 810c, 810d. Thus, when the host list entry indicia 824a is clicked on by the user, the user selects the associated host for assignment to the selected unassigned host ports. It is appreciated that other display elements may be used to select a displayed host such as check boxes and check dots, for example.

The host port assignment interface displays (block 352, FIG. 3) an indication of which hosts of the list of currently identified hosts has been selected by the user for host port assignment. In a manner similar to that shown in FIG. 9 for host port selection, selection of a currently identified host for host port assignment is indicated by the host port assignment GUI by changing the background color of the host list entry indicia. Thus, in the example, of FIG. 11, the currently identified host Host1 may be selected by the user for host port assignment and indicated as such by, for example, a darker background of the host list entry indicia 824a as compared to a lighter background of a host list entry indicia for an unselected host. It is appreciated that selection of a currently identified host for host port assignment may be indicated in other techniques, depending upon the particular application. For example, check boxes or check dots may be filled in or overlaid with a suitable character indicia such as a check mark, for example.

Upon receiving the user's selection of a host for host port assignment to the selected host ports, the proposed host port assignment of selected host ports to the selected host may be tested (block 356, FIG. 3). FIG. 4 shows examples of the tests of block 356, FIG. 3 in greater detail. As shown in FIG. 4, in a manner similar to that discussed above for an added host, the selected host may be tested (block 460) by the host port assignment interface for compatibility with the host ports which were selected by the user. For example, if the operating system of the selected host is determined (block 460) to be different from that of the operating system of the selected host ports, the selected host may be deemed to be incompatible with the selected host. Accordingly, if it is determined (block 460) that the selected host is not compatible with the selected host ports, the host port assignment interface in this embodiment, rejects (block 364, FIG. 3) the proposed host port assignment.

Returning to FIG. 3, the host port assignment interface following rejection of a proposed host port assignment, permits the user to select different host ports (block 320), add a host (block 328), or select a different host (block 352) for host port assignment and tests again (block 356). In addition, if the selected host was found not to be compatible (block 460, FIG. 4) with the selected host ports, and in addition, no added host was found to be compatible (block 340, FIG. 3) with the selected host ports, a warning informational message provided by informational indicia 920 (FIG. 9) indicates to the user that "No host has compatible type and volume mapping. Please select a compatible host." If an incompatible host is nonetheless selected (block 360, FIG. 4) for assignment to the selected host ports, the proposed assignment is rejected (block 364) as discussed above.

In the illustrated embodiment, additional tests may be performed (block 356) in addition to the compatibility test described above. FIG. 4 depicts an example of such an additional test which may be performed upon selection of a proposed assignment of selected host ports to a selected host. If the selected host was found (block 460) to be compatible with the selected host ports, a further determination (block 464) may be made as to whether the selected host ports are all mapped to the same volumes or groups of volumes. If not, the host port assignment interface may issue (block 470) a warning informational message provided by, for example, informational indicia 1210 (FIG. 12) which indicate to the user that "The host port and host are mapped to different volumes." The informational indicia 1210 may be provided by a pop-up window 1220, for example, overlaying the window 814. To increase the prominence of the warning information message of the indicia 1210, the window 1220 may include for example, additional warning informational indicia 1224 indicating the text "Warning" and an icon 1228 representing a warning.

Figure 12:
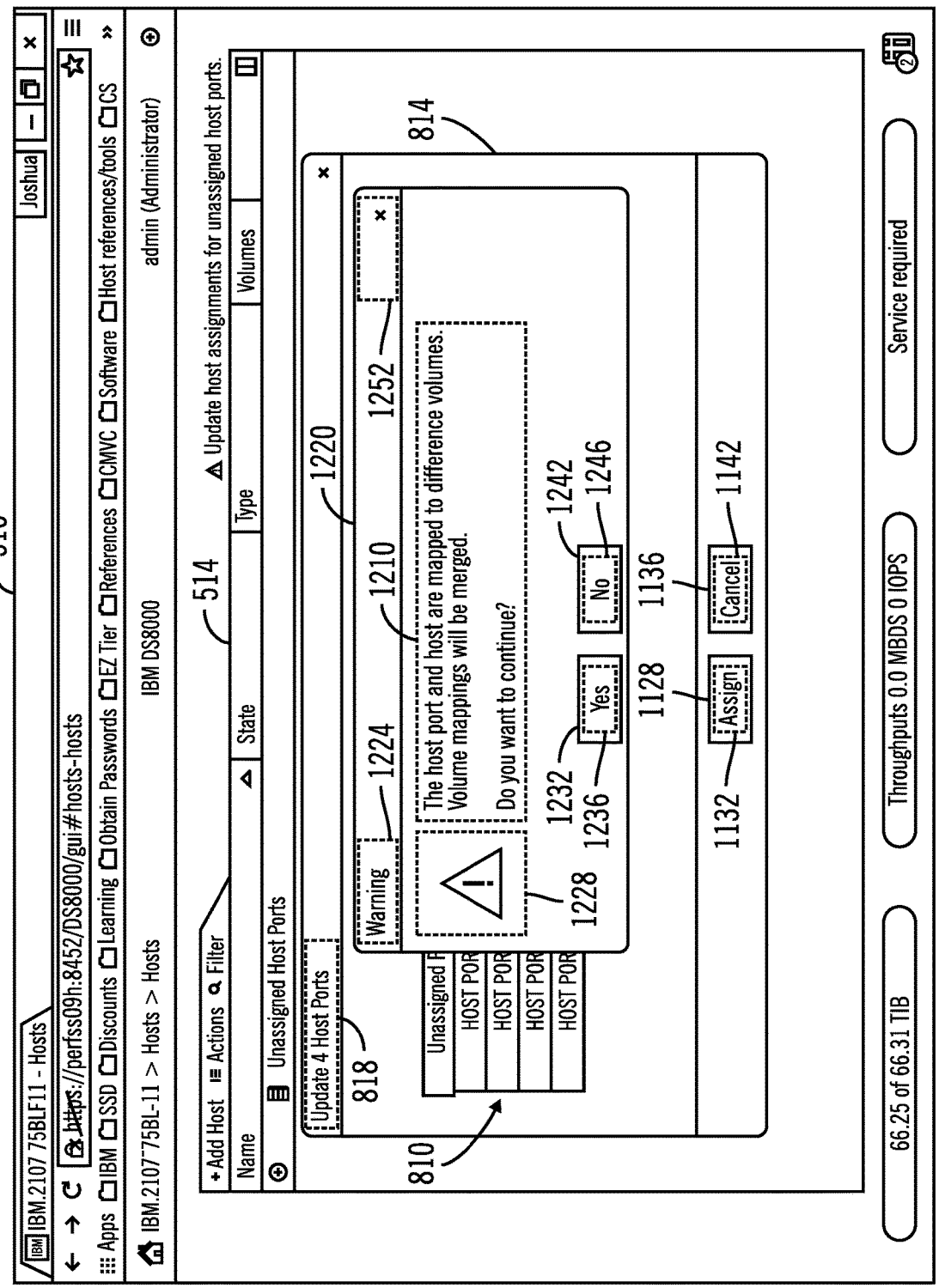
FIG. 12 illustrates an embodiment of a host port assignment interface of a management interface in accordance one aspect of the present description, providing an informational warning message of the host port assignment interface.

In the illustrated embodiment, if the selected host ports are not all mapped to the same volume or volumes, the "Volume mappings will be merged" as indicated by the warning informational message provided by informational indicia 1210, if the user continues with the assignment. Accordingly, the host port assignment interface issues (block 474, FIG. 4) an invitation to continue the assignment of the selected host ports to the selected host. In the embodiment of FIG. 12, the warning informational message provided by informational indicia 1210 invites the user to decide whether to continue with the text "Do you want to continue?" with the understanding that if the user decides to continue with the assignment of the selected host ports to the selected host, the volumes mappings will be merged.

If the host port assignment interface receives (block 480) an acceptance of the invitation to continue, the host port assignment process continues to the operation represented by the block 368, FIG. 3, discussed below. In a similar manner, if it is determined (block 464) that the selected host ports are all mapped to the same volumes, the host port assignment process continues to the operation represented by the block 368, FIG. 3, discussed below.

To receive the user's instruction to complete the proposed assignment notwithstanding the merger warning, the host port assignment dialog pop-up window 1220 of the host port assignment GUI. includes an input button 1232 having informational label indicia 1236 representing the text "Yes." By clicking on the "Yes" labeled input button 1232, the user signals to the host port assignment interface the user's acceptance of continuing the selected host port assignment process notwithstanding the merger warning, and the user's acceptance is received (block 480) by the host port assignment interface.

Conversely, to receive the user's rejection of the invitation to continue due to the merger warning, the warning pop-up window 1220 includes an input button 1242 having informational label indicia 1246 representing the text "No." By clicking on the "No" labeled input button 1234, the user signals to the host port assignment interface the user's rejection of continuing the selected host port assignment process, and the user's rejection is received (block 480) by the host port assignment interface. Alternatively, the user may click on the "X" window feature 1252 to cancel the selected assignment process. If the host port assignment interface receives (block 480) a rejection of the invitation to continue, the host port assignment interface in this embodiment, rejects (block 364, FIG. 3) the proposed host port assignment and the user is provided the opportunity to revise or select another host port assignment as discussed above.

Referring back to FIG. 3, if the proposed host port assignment passes (block 360) the tests discussed above, an informational message provided by informational indicia 1122 (FIG. 11), indicates that the two selected host ports (host ports, hostport1 and hostport2 in this example) will be assigned to the selected host which is host1 in this example. In addition, a virtual input button 1128 of the host port assignment pop-up dialog window 814 becomes enabled for an input function of the host port assignment interface. More specifically, the user input button 1128 becomes enabled to receive the user's instruction to the host port assignment interface to complete the assignment of the selected host ports to the selected host. The user input button 1128 of the host port assignment pop-up dialog window 814 has suitable label indicia 1132 such as "Assign", for example, to indicate to the user the process initiated by activating the user input button 1128. In the embodiment of FIG. 11, such enablement of the input functions of the user input button 1128 is indicated by lack of greying out of the user input button 1128.

The host port assignment interface determines whether an instruction has been received (block 368) to complete the assignment of the selected host ports to the selected host. The instruction to complete the assignment may be transmitted to the host port assignment interface by the user clicking on the "Assign" input button 1128, in this example. Conversely, if the user decides not to complete the proposed host port assignment, the user may click on a "Cancel" input button 1136 having suitable informational text indicia 1142 such as the text "Cancel", for example, to indicate to the user the process initiated by activating the user input button 1136. If the host port assignment interface receives (block 368, FIG. 3) an instruction to cancel rather than complete the proposed host port assignment, the proposed host port assignment is rejected (block 364) and the user is provided an opportunity to revise the proposed host port assignment, or add additional hosts as described above.

Upon receipt (block 368) of an instruction to complete the proposed assignment sent by the user clicking on the enabled "Assign" input button 1128, the host port assignment interface merges (block 372) the volume mappings of the selected host ports (if the volume mappings of the selected host ports are not already the same), and assigns the selected host ports (host ports hostport1 and hostport2, in this example) to the selected host (host1 in this example). In addition, the host ports which were assigned in response to the user's instruction are removed (block 372) from the list of unassigned host ports since those host ports are no longer unassigned but are instead assigned to the selected host. The host port column 1118 in the host table of the window 814 may be updated to indicate that 2 host ports have been assigned to host host1. In addition, a host port column in a host table of the host page 514 may be updated to identify the host ports hostport1 and hostport2 as assigned to that host, host1.

A determination (block 376) is made by the host port assignment interface as to whether there are any remaining unassigned host ports. In this example, host ports hostport3 and hostport4 remain unassigned at this stage. Accordingly, if unassigned host ports remain such as host ports hostport3 and hostport4, those remaining unassigned host ports are displayed (block 316) by the host port assignment interface.

Figure 13:
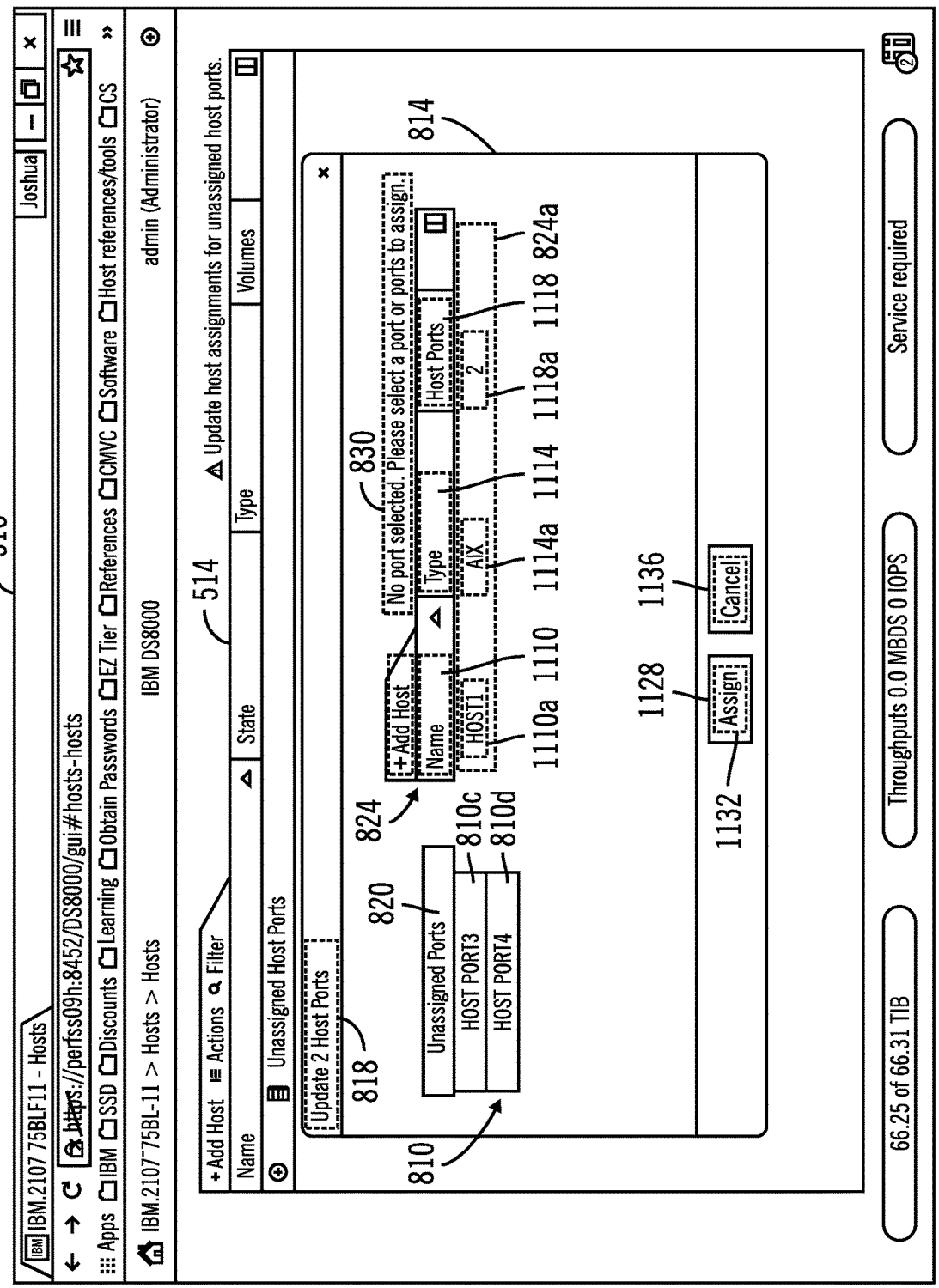
FIG. 13 illustrates an embodiment of a host port assignment interface of a management interface in accordance one aspect of the present description, in which assigned host ports have been removed from the listing indicating unassigned host ports available for selection for assignment to a host.

FIG. 13 shows for example, the resultant display (block 320) of the list of unassigned host ports after the host ports hostport1 and hostport2 have been removed from the list because they are now assigned to the host host1. Host ports hostport3 and hostport4 remain on the displayed list of unassigned ports because they were not assigned by the proposed assignment discussed above. The user is provided an opportunity in the manner discussed above to repeat the host port assignment process of the host port assignment interface until no more unassigned host ports remain to be assigned. Once all host ports have been assigned, the host port assignment interface terminates (block 380).

It is seen from the above that a storage management interface in accordance with the present description, facilitates the entry of storage configuration data assigning unassigned host ports to a host. Other features and aspects may be realized, depending upon the particular application.

A management interface in accordance with the present description may be a system, a method, and/or a computer program product, for example. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts 100 and storage servers may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 14:
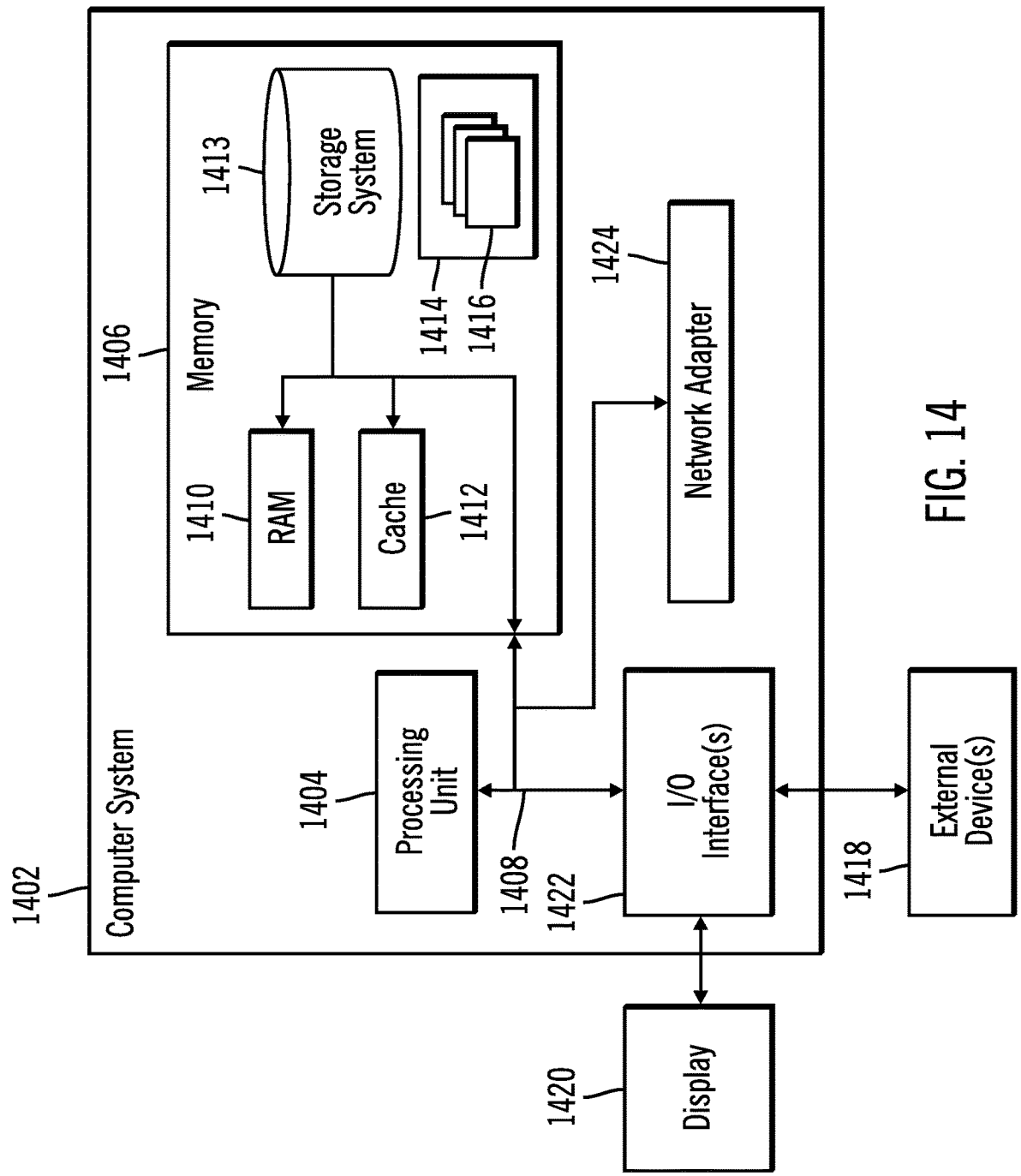
FIG. 14 illustrates an embodiment of a computing system employing a host port assignment interface of a management interface in accordance one aspect of the present description.

As shown in FIG. 14, the server 12 either alone or in combination with one or more of the hosts, in the form of a general-purpose computing device. or computer system 1402 employing a host port assignment interface of a management interface in accordance one aspect of the present description. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the description provided herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, touch pad, touch screen, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing a storage management interface to manage host ports in a computing system having a server and one or more hosts, wherein the computer program product comprises a computer readable storage medium having program instructions embodied therewith, the program instructions executable by a processor to cause operations, the operations comprising:
    maintaining data structures for storing host port assignment configuration data identifying host ports in the server assigned to an associated host;
    detecting unassigned host ports which have not been identified as being assigned to an associated host;
    in response to detecting unassigned host ports, inviting a user to assign unassigned host ports;
    generating a graphical user interface (GUI) page indicating unassigned host ports comprising at least one of the host ports not assigned to a host;
    receiving in the GUI page, user selection of at least one of the unassigned host ports indicated in the GUI page;
    receiving user selection of a host to assign to the selected at least one of the unassigned host ports; and
    updating the data structures for storing host port assignment configuration data to indicate the host assigned to the selected at least one of the unassigned host ports.

2. The computer program product of claim 1, wherein the inviting a user to assigned unassigned host ports includes generating a pop-up window to interrupt use of the storage management interface by the user, wherein the pop-up window includes display elements inviting the user to assign unassigned host ports and further includes input display elements for receiving the user's acceptance of the invitation.

3. The computer program product of claim 1, wherein the operations further comprise generating a graphical user interface (GUI) page for managing hosts, and wherein the inviting a user to assigned unassigned host ports includes generating in response to the detecting unassigned host ports, a message on the GUI page for managing hosts, wherein the message indicates that host ports remain unassigned and invites a user to assigned unassigned host ports.

4. The computer program product of claim 1, wherein the generating the GUI page indicating unassigned host ports is generated in response to the detecting unassigned host ports.

5. The computer program product of claim 1, wherein the generating the GUI page further includes generating the GUI page to indicate hosts currently identified in the computing system, and wherein the operations further comprise in response to receiving in the GUI page, user selection of at least one of the unassigned host ports indicated in the GUI page, inviting the user to identify an additional host.

6. The computer program product of claim 1 wherein the operations further comprise testing the received user selection of at least one of the unassigned host ports indicated in the GUI page, for compatibility with the received user selection of a host to assign to the selected at least one of the unassigned host ports, and in response to a failure to pass the compatibility test, rejecting the assignment of the received user selection of at least one of the unassigned host ports indicated in the GUI page, to the received user selection of a host.

7. The computer program product of claim 1 wherein storage volumes are mapped to at least one of the unassigned host ports indicated in the GUI page, the operations further comprising determining whether the storage volumes mapped to a received user selection of a plurality of unassigned host ports indicated in the GUI page are the same, and if not, issuing a warning message that mappings of storage volumes to the received user selection of the plurality of unassigned host ports indicated in the GUI page will be merged if the assignment to the received user selection of a host, is completed.

8. A system for use with a host, comprising:
    a server having a processor and a plurality of host ports configurable for coupling the server to a host; and a
    computer program product for providing a storage management interface to manage host ports in the system, wherein the computer program product comprises a computer readable storage medium having program instructions embodied therewith, the program instructions executable by the processor to cause operations, the operations comprising:
    maintaining data structures for storing host port assignment configuration data identifying host ports in the server assigned to an associated host;
    detecting unassigned host ports which have not been identified as being assigned to an associated host;
    in response to detecting unassigned host ports, inviting a user to assign unassigned host ports;
    generating a graphical user interface (GUI) page indicating unassigned host ports comprising at least one of the host ports not assigned to a host;
    receiving in the GUI page, user selection of at least one of the unassigned host ports indicated in the GUI page;
    receiving user selection of a host to assign to the selected at least one of the unassigned host ports; and
    updating the data structures for storing host port assignment configuration data to indicate the host assigned to the selected at least one of the unassigned host ports.

9. The system of claim 8, wherein the inviting a user to assigned unassigned host ports includes generating a pop-up window to interrupt use of the storage management interface by the user, wherein the pop-up window includes display elements inviting the user to assign unassigned host ports and further includes input display elements for receiving the user's acceptance of the invitation.

10. The system of claim 8, wherein the operations further comprise generating a graphical user interface (GUI) page for managing hosts, and wherein the inviting a user to assigned unassigned host ports includes generating in response to the detecting unassigned host ports, a message on the GUI page for managing hosts, wherein the message indicates that host ports remain unassigned and invites a user to assigned unassigned host ports.

11. The system of claim 8, wherein the generating the GUI page indicating unassigned host ports is generated in response to the detecting unassigned host ports.

12. The system of claim 8, wherein the generating the GUI page further includes generating the GUI page to indicate hosts currently identified in the system, and wherein the operations further comprise in response to receiving in the GUI page, user selection of at least one of the unassigned host ports indicated in the GUI page, inviting the user to identify an additional host.

13. The system of claim 8 wherein the operations further comprise testing the received user selection of at least one of the unassigned host ports indicated in the GUI page, for compatibility with the received user selection of a host to assign to the selected at least one of the unassigned host ports, and in response to a failure to pass the compatibility test, rejecting the assignment of the received user selection of at least one of the unassigned host ports indicated in the GUI page, to the received user selection of a host.

14. The system of claim 8 further comprising storage volumes controlled by the server wherein the storage volumes are mapped to at least one of the unassigned host ports indicated in the GUI page, the operations further comprising determining whether the storage volumes mapped to a received user selection of a plurality of unassigned host ports indicated in the GUI page are the same, and if not, issuing a warning message that mappings of storage volumes to the received user selection of the plurality of unassigned host ports indicated in the GUI page will be merged if the assignment to the received user selection of a host, is completed.

15. A method, comprising:
providing a storage management interface to manage host ports in a computing system, said providing comprising:
  maintaining data structures for storing host port assignment configuration data identifying host ports in a server assigned to an associated host;
  detecting unassigned host ports which have not been identified as being assigned to an associated host;
  in response to detecting unassigned host ports, inviting a user to assign unassigned host ports;
  generating a graphical user interface (GUI) page indicating unassigned host ports comprising at least one of the host ports not assigned to a host;
  receiving in the GUI page, user selection of at least one of the unassigned host ports indicated in the GUI page;
  receiving user selection of a host to assign to the selected at least one of the unassigned host ports; and
  updating the data structures for storing host port assignment configuration data to indicate the host assigned to the selected at least one of the unassigned host ports.

16. The method of claim 15, wherein the inviting a user to assigned unassigned host ports includes generating a pop-up window to interrupt use of the storage management interface by the user, wherein the pop-up window includes display elements inviting the user to assign unassigned host ports and further includes input display elements for receiving the user's acceptance of the invitation.

17. The method of claim 15, wherein the providing further comprises generating a graphical user interface (GUI) page for managing hosts, and wherein the inviting a user to assigned unassigned host ports includes generating in response to the detecting unassigned host ports, a message on the GUI page for managing hosts, wherein the message indicates that host ports remain unassigned and invites a user to assigned unassigned host ports.

18. The method of claim 15, wherein the generating the GUI page indicating unassigned host ports is generated in response to the detecting unassigned host ports.

19. The method of claim 15, wherein the generating the GUI page further includes generating the GUI page to indicate hosts currently identified in the computing system, and wherein the method further comprises in response to receiving in the GUI page, user selection of at least one of the unassigned host ports indicated in the GUI page, inviting the user to identify an additional host.

20. The method of claim 15 wherein the providing further comprises testing the received user selection of at least one of the unassigned host ports indicated in the GUI page, for compatibility with the received user selection of a host to assign to the selected at least one of the unassigned host ports, and in response to a failure to pass the compatibility test, rejecting the assignment of the received user selection of at least one of the unassigned host ports indicated in the GUI page, to the received user selection of a host.

21. The method of claim 15 wherein storage volumes are mapped to at least one of the unassigned host ports indicated in the GUI page, and wherein the providing further comprises determining whether the storage volumes mapped to a received user selection of a plurality of unassigned host ports indicated in the GUI page are the same, and if not, issuing a warning message that mappings of storage volumes to the received user selection of the plurality of unassigned host ports indicated in the GUI page will be merged if the assignment to the received user selection of a host, is completed.

* * * * *